Patented May 22, 1945

2,376,608

UNITED STATES PATENT OFFICE 2,376,608

TARE POISE CONTROL MECHANISM

Elbert J. Lynch, St. Johnsbury, Vt., assignor to to Fairbanks, Morse & Co., Chicago, Ill., a corporation of Illinois Application September 23, 1942, Serial No. 459,355

5 Claims. (Cl. 265—6)

This invention relates to weighing scales and more particularly to means for controlling the taring mechanism of the scale.

Heretofore, it has been a common practice to provide certain types of weighing scales with enclosed taring mechanism adapted to be operated by an external knob or handle, the mechanism being operated and set at the proper position to compensate for the tare load on the scale. However, in such devices it is easily possible for the taring mechanism to be either accidentally or deliberately moved after its first positioning, thus causing erroneous weighings and recordings.

It is an important object of this invention to provide means for controlling enclosed taring mechanism combined with means for preventing operation of the taring mechanism control means.

Another object is the provision of automatic electrically controlled means for preventing operation of the taring mechanism control means until the end of the weighing and recording cycles.

These and other objects of the invention and the means for their attainment will be more apparent from the following detailed description, taken in connection with the accompanying drawings illustrating a preferred embodiment of my invention and in which.

Figure 1:
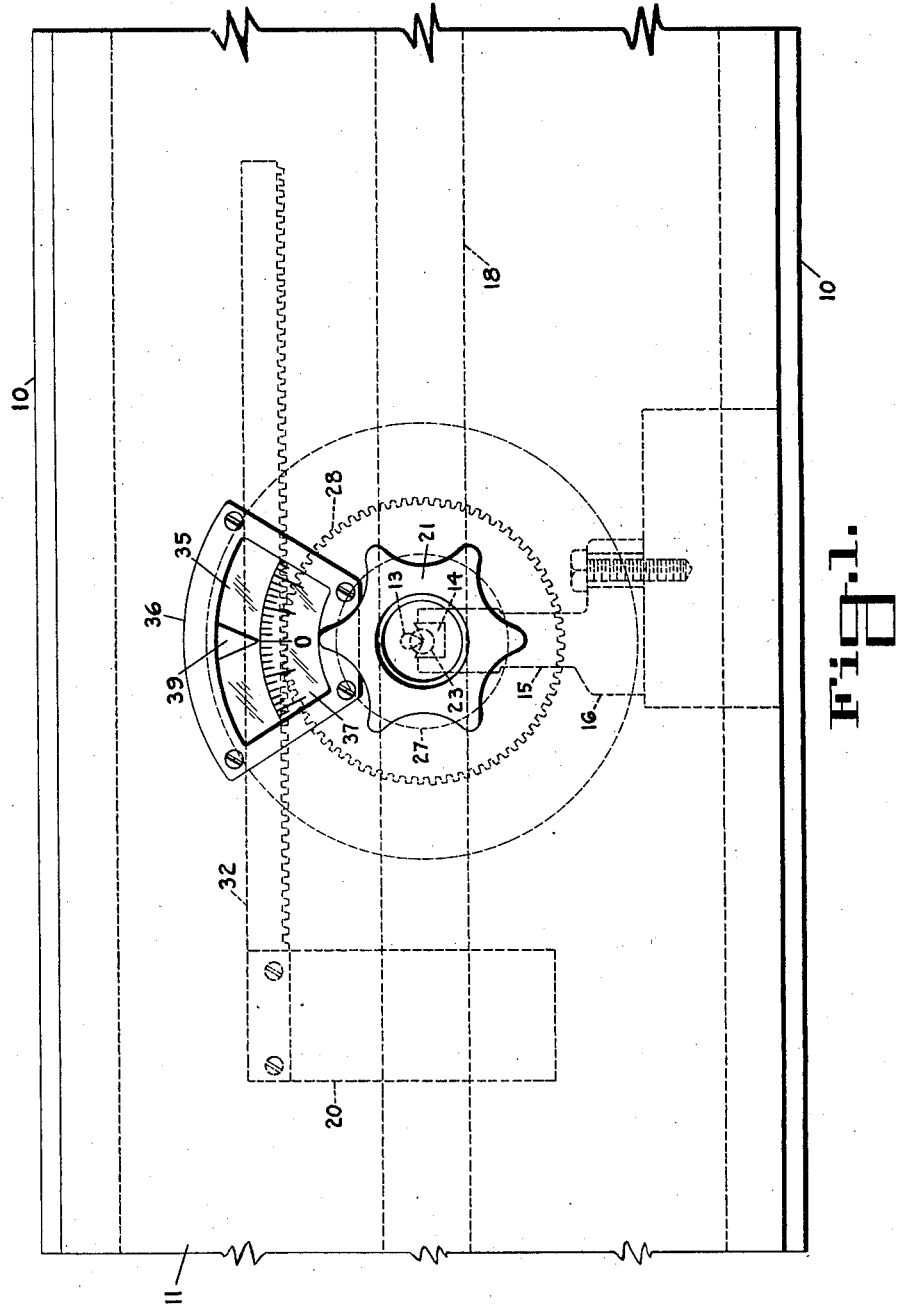
Fig. 1 is a front elevational view of a portion of a weighing scale beam housing, showing the device of the present invention therein.

In the drawings, only so much of a weighing scale and recording mechanism are illustrated as is necessary for a clear understanding of the invention, and for more detailed information reference is made to U. S. Patent No. 2,070,011, Hadley et al.

Referring to the drawings, numeral 10 designates a weighing scale beam housing which has mounted over the front thereof a cover plate 11. Pivotally mounted in the housing 10 is the usual main beam or lever 12 (Fig. 3), in this case shown as a double-web beam, which is provided with a fulcrum knife-edge pivot 13 adapted to be seated in a pair of bearings 14 mounted in the upper ends of the vertical arms 15 of a U-shaped bearing stand 16. Also provided in the beam 12 is the usual load pivot 17 which transmits the force of a load on the scale understructure to the beam.

To provide means for compensating for the weight of a box, barrel, can, or other container on the scale, when only the weight value of the contents thereof is desired, the beam 12 is provided with an auxiliary or tare beam 18 attached thereto by means of studs 19, the tare beam 18 thus being adapted to oscillate freely with the main beam 12.

A poise 20 is slidably mounted on the tare beam 18 and is adapted to be controlled manually by means located outside the beam housing. This means comprises a knob 21 pinned by its hub 22 to the outer end of a rotatable shaft 23 extending into the interior of the beam housing 10. A journal member 24 secured by screws 25 to the cover plate 11 of the beam housing 10 receives the shaft 23 and is provided with a cavity for the reception of a coiled spring 26. This cavity is of such dimensions as to slidably admit the hub 22 of the knob 21, one end of the spring 26 abutting thereagainst while the other end is retained by the base of the cavity in the journal member 24.

Thus the knob 21 may be pushed inwardly against the force of spring 26, and upon release the spring will return the knob outwardly to the extent permitted by a spoked drive wheel 27 fixedly mounted on the shaft 23 inside the beam housing and abutting, when the knob 21 has returned to normal position, against the base of the journal member 24.

The immediate means for moving the poise 20 consists of a gear wheel 28 provided with a pair of short studs 29 which are adapted to engage the spokes of the drive wheel 27. The gear wheel 28 is supported by and rotatably mounted on a bushing 30 which is fixedly secured in a block 31 attached to the tare beam 18. The bushing and the tare beam are each provided with contiguous openings through which the shaft 23 extends. The teeth of the gear wheel 28 mesh with the teeth of a horizontal rack bar 32, one end of which is secured to the poise 20. Accordingly, when the knob 21 and shaft 23 are pushed inwardly and rotated, the spokes of the drive wheel 27 will engage the studs 29 on the gear wheel 28 and cause rotation thereof. Consequently, through rack bar 32 the poise 20 is caused to be moved along tare beam 18. The teeth of the rack bar 32 are kept in constant mesh with the teeth of gear wheel 28 by means of a roller wheel 33 which engages the back of the rack bar 32, the roller wheel 33 being mounted on a bracket 34 secured to the side of the block 31.

For visually indicating the effective tare weight, a glass window 35 is provided in the cover plate 11 and held by sashes 36, through which may be read the indicia on a circular chart 37 which is fixedly mounted on a tubular extension 38 formed on gear wheel 28. Rotation of gear wheel 28 will cause consequent rotation of the chart 37 and indication of the amount of tare by a pointer 39, secured to the side of roller bracket 34, the end thereof being adapted to extend downwardly over the face of the chart. By mounting the pointer 39 in this manner the pointer is always kept in a position at right angles to the tare beam 18, thus providing accurate indication.

Figure 3:
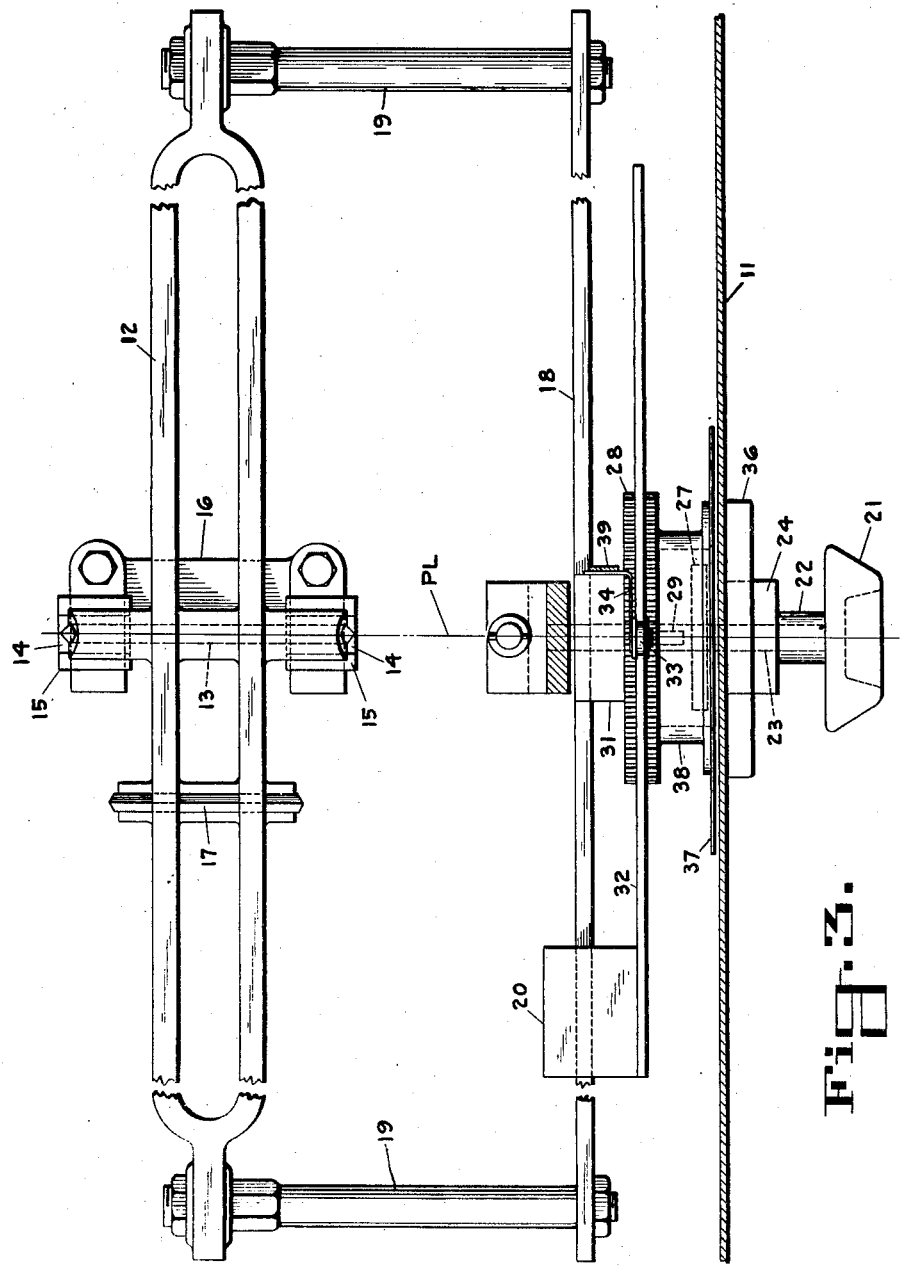
Fig. 3 is a top plan view, partly in section, of the interior of the beam housing showing the taring mechanism and the main beam.

A very important feature of the described construction is the location of the axis of shaft 23 precisely in alignment with the pivotal axis of the beam structure, as will appear in Figs. 1 and 3. Mounting this mechanism in any other position would tend to detract from the proper action of the beam, but by mounting it on the fulcrum pivot line PL (Fig. 3), no adverse effects result.

The means for preventing operation of the poise operating mechanism includes an electrical solenoid 40 (Fig. 2) provided with a vertically slidable armature or core member 41, the head 42 of which has pinned in a slot therein the lower narrowed end portion of a vertically extended stop bar 43. The upper end of stop bar 43 is formed as a short shaft 44 which extends upwardly through an opening in a supporting bracket 45, bolted to the top of the beam housing 10, the end of shaft 44 being provided with a pin 46 and washer 47 which seats on the upper end of a coil spring 48 mounted over the shaft 44 and supported by the bracket 10.

Figure 2:
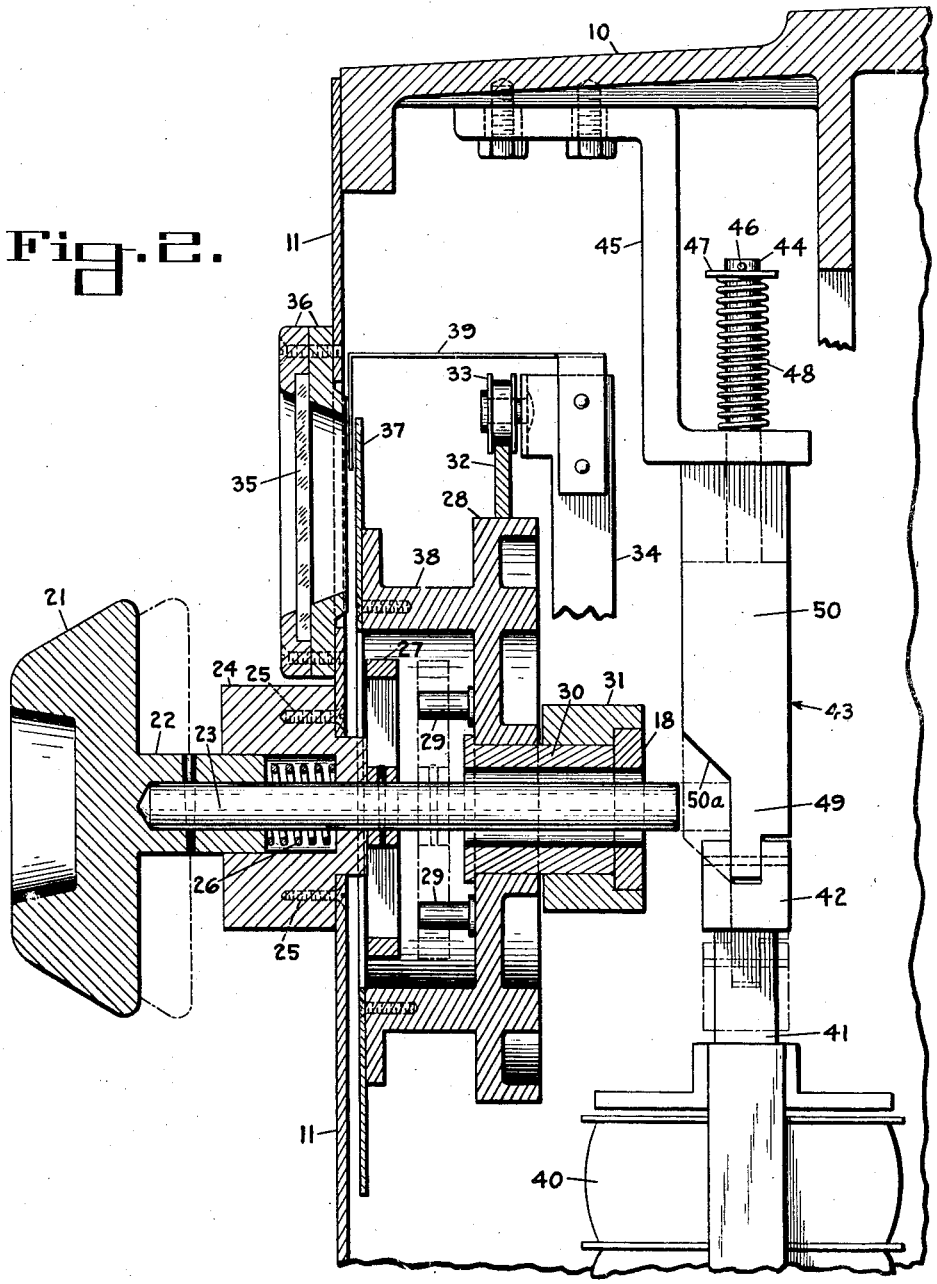
Fig. 2 is a sectional view of the mechanism taken approximately on a vertical line through the beam fulcrum pivot.

The stop bar 43 is formed to provide a narrow section 49 and a wide section 50, and when the device is in inoperative position as shown in Fig. 2, the narrow section 49 is in a position opposite the end of the rotatable shaft 23 of the poise operating mechanism. However, upon energization of the solenoid 40, the core member 41 thereof will be drawn downwardly, pulling the stop bar 43 with it against the force of spring 48. This causes the wide section 50 of the stop bar to be positioned opposite the end of the shaft 23, as shown in dot-dash outline in Fig. 2, in such a manner that the shaft 23 cannot be pushed inwardly far enough so that the spoked wheel 27 will engage pins 29 to move the tare poise. Thus, any change in the tare beam balance cannot be made until the solenoid 40 has been deenergized and the spring 48 returns the stop bar 43 to its inoperative position, with the narrow section 49 opposite the end of shaft 23. The stop bar 43 is provided at the juncture of sections 49 and 50 with a sloping face 50a which will force backwardly the shaft 23, upon downward pull thereof by energization of the solenoid 40, when the shaft 23 is held in deliberately or for some reason the spring 26 does not return it to inoperative position.

Figure 4:
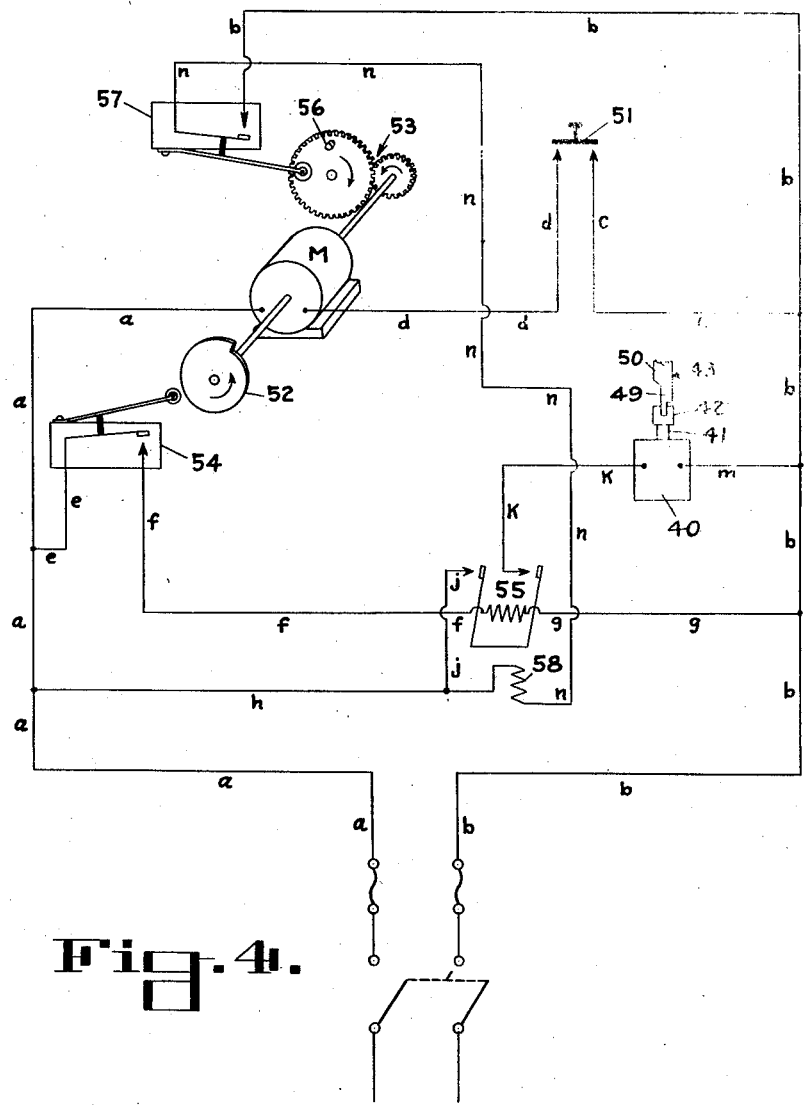
Fig. 4 is a circuit diagram showing the electrical connection between a recording mechanism and the taring mechanism.

In the operation of a weighing scale employing this invention, an empty container or hopper is placed on the scale lever system and the taring mechanism operated so that tare poise 20 will be located on the tare beam 18 in such a position as to properly balance the beam, the weight of the hopper being visually indicated by chart 37 and pointer 39. At this stage the main dial of the scale should indicate zero. Since it is generally desired that the zero weight recording be made, the operator will close switch 51 (Fig. 4), energizing drive motor M for the recording mechanism, circuit a—d—51—c—b, which operates a cam 52 and a two-to-one gear device 53. The motor will automatically make one complete revolution to operate the recording mechanism (not shown) to print the zero weight. Thus the small gear 53 will rotate one complete revolution while the larger gear rotates one-half a revolution. Upon rotation of cam 52, switch 54 will momentarily close, completing circuit a—e—54—f—55—g—b through a relay 55 of mechanical latched-closed type, the contacts of which will close and so remain through the mechanical latch. This will energize the solenoid 40, circuit a—h—j—55—k—40—m—b, causing the wide portion 50 of stop bar 43 to block inward movement of shaft 23, and thereby prevent an operative connection being had between the tare poise manipulating knobs 21 and poise drive gear 28. Accordingly, during the operation of the printing or recording mechanism the position of the tare poise 20 cannot be changed.

After the zero weight value has been recorded the hopper may be filled to any predetermined amount, after which switch 51 is again closed by the operator, energizing motor M, which again rotates cam 52 and small gear 53 one complete revolution to operating the recording mechanism and thus record the weight of the load in the hopper. Upon full rotation of small gear 53 the large gear completes the second half of its revolution at which time a pin 56 thereon operates a switch 57, energizing the latch release coil 58 on relay 55, circuit b—57—n—58—h—a, which unlatches relay 55 to open the contacts thereof, thus deenergizing solenoid 40. This allows the solenoid-operated stop mechanism to resume its normally inoperative position to permit insertion of shaft 23 to a point where the poise operating mechanism may be again operated and a new cycle initiated.

It is to be understood that the form of my invention herewith shown and described is to be taken as a preferred example of the same, and that various changes in the shape, size and arrangement of parts may be resorted to without departing from the spirit of the invention which is defined on the subjoined claims.

I claim:

1. In a scale having a tare beam, a tare poise thereon, an enclosure for said tare beam and poise, means for adjusting the tare poise, including a shaft projecting outwardly of the tare beam enclosure and mounted for endwise and rotary movement, a clutch assembly having a driving member mounted on said shaft and having a driven member operatively connected to said tare poise, said clutch assembly being disposed in engaged condition by inward movement of said shaft, and means acting on said shaft effective to lock said clutch device in disengaged condition.

2. In a scale having a tare beam and tare poise thereon, an enclosure for said tare beam and poise, means for adjusting the tare poise, including a shaft projecting outwardly of the tare beam enclosure and mounted for endwise and rotary movement, a clutch assembly having a driving member mounted on said shaft and having a driven member operatively connected to said tare poise, said clutch assembly being disposed in engaged condition by inward movement of said shaft, and a locking member movable into the path of said shaft to prevent inward movement thereof.

3. In a scale having a motor-operated recording device for printing weight values, and an enclosed tare beam and tare poise thereon, a member for adjusting said tare poise, and means for preventing adjusting movement of the tare poise by said member, said means including a locking member, an electromagnet for actuating said locking member, camming means driven by the motor of said recording device, and switching means actuated by said camming means for controlling the energization of said electromagnet.

4. In a scale including a motor-operated recording device for printing weight values, and an enclosed tare beam and tare poise thereon, a manipulating member for adjusting said tare poise, a locking member operable to prevent movement of the tare poise by said manipulating member, and means responsive to operation of the recording device motor for moving said locking member into locking position and holding it therein through two successive recording operations, said means including an electromagnetic actuating device for said locking member, switching means connected in controlling relation to said electromagnetic device, and cam means driven by the recording device motor for controlling the actuation of said switching means.

5. In a scale having a motor-operated recording device for printing weight values and an enclosed tare beam and tare poise thereon, means for adjusting said tare poise, comprising a rotatable and endwise movable shaft, a manipulating member on one end of said shaft, a normally disengaged clutch adapted to be engaged by endwise movement of said shaft, means operatively interconnecting said clutch and tare poise whereby said tare poise is adapted to be adjusted by rotation of said manipulating member when said clutch is disposed in engaged condition; a detent movable into the path of endwise movement of said shaft to prevent engagement of said clutch, an electromagnet for moving said detent as aforesaid, and control means for said electromagnet, said control means including cam-actuated switches driven by the recording device motor and adapted to effect energization of said electromagnet, and to maintain the same energized through two complete recording operations.

ELBERT J. LYNCH.